US005550829A

United States Patent [19]

Wang

[11] Patent Number: 5,550,829
[45] Date of Patent: Aug. 27, 1996

[54] METHOD FOR REALLOCATION FRAME ASSIGNMENTS OF RECEIVES IN A COMMUNICATION SYSTEM

[75] Inventor: Zhonghe Wang, Lake Worth, Fla.

[73] Assignee: Motorola, Inc., Schaumburg, Ill.

[21] Appl. No.: 547,342

[22] Filed: Oct. 24, 1995

[51] Int. Cl.$^6$ .................................................. H04J 3/16
[52] U.S. Cl. ........................................ 370/95.1; 455/38.3
[58] Field of Search ............................. 370/85.7, 95.1, 370/95.2, 95.3, 92; 455/33.1, 33.2, 38.3, 54.1, 343, 56.8, 62, 63; 340/825.44, 825.5, 825.08; 379/59–60

[56] References Cited

U.S. PATENT DOCUMENTS

| | | | |
|---|---|---|---|
| 4,398,192 | 8/1983 | Moore et al. | 340/825.44 |
| 4,422,162 | 12/1983 | Davis et al. | 385/227 |
| 4,495,619 | 1/1985 | Acampora | 370/104 |
| 4,668,949 | 5/1987 | Akahori et al. | 340/825.44 |
| 4,860,003 | 8/1989 | DeLuca et al. | 340/825.44 |
| 4,897,835 | 1/1990 | Gaskill et al. | 370/94.1 |
| 5,128,932 | 7/1992 | Li | 370/60 |
| 5,150,954 | 9/1992 | Hoff | 370/95.1 |
| 5,280,630 | 1/1994 | Wang | 455/56.1 |
| 5,325,088 | 6/1994 | Willard et al. | 340/825.44 |
| 5,437,054 | 7/1995 | Rappaport et al. | 455/33.1 |
| 5,513,379 | 4/1996 | Benveniste et al. | 455/33.1 |

OTHER PUBLICATIONS

"Semi–Distributed Addressing, a New Concept for ERMES Radio Protocol" dated May 11, 1989 by an unknown author.
"Sub–addressing, a Battery Saving Method" dated Mar. 16, 1989 by an unknown author.

*Primary Examiner*—Douglas W. Olms
*Assistant Examiner*—Ajit Patel
*Attorney, Agent, or Firm*—Keith A. Chanroo

[57] ABSTRACT

A communication system (100) for reallocating frame assignments of a receiver (140). A message receiver (108) receives messages designating the receiver (140) and a transmitter (120) transmits a signal to the plurality of receivers (140). The signal has a plurality of frames (200), each has a frame identifier (402), an owner identifier (404), a frame lending offset (406) and a frame borrowing offset (408). A queue controller (132) measures a parameter indicating a traffic on each frame (200) to determine a lending threshold and a borrowing threshold. A processor (109) identifies a frame (603) with traffic below the lending threshold and another frame (605) with traffic exceeding the borrowing threshold and calculates the frame lending and borrowing offsets. A message formatter (114) encodes the frame identifier (402), the owner identifier (404), the frame lending and borrowing offset (406, 408) in the signal and a message allocator (134) distributes the messages.

17 Claims, 7 Drawing Sheets

METHOD FOR REALLOCATION FRAME ASSIGNMENTS OF RECEIVES IN A COMMUNICATION SYSTEM

FIELD OF THE INVENTION

This invention relates in general to communication systems, and more specifically to method for reallocating frame assignments of at least one receiver in a synchronous communication system.

BACKGROUND OF THE INVENTION

Prior art communication systems have endeavored to efficiently communicate information to receivers while extending battery life of the receivers at the expense of system throughput or vice versa. One prior art protocol provides a preamble signal which initially synchronizes the receivers to a protocol signal. One of the several well known preamble signals may be used, each identifying a different group of receivers which are used to decode message information.

The operation of the prior art communication system requires receivers to synchronously decode the received signal subsequent to being synchronized to the protocol signal. A receiver synchronized to the signal needs to search for its address in only a predetermined one of M frames. In the remaining M-1 frames, the receiver conserves power by one of the well known techniques of battery saving. However, when M is too small, the receivers have to sample the channel frequently which results in poor (or low) battery life and when is too large, the receivers sample the channel less frequently resulting in improved battery life but reduced message throughput.

It is desirable to provide battery saving features for the receiver during the absence of a signal being directed to the receiver. This has typically been accomplished with a preamble signal preceding the message transmission. The transmissions begin with a long preamble signal providing for receiver synchronization before the message transmission and providing for battery saving in the absence thereof. The preamble signal although providing for battery saving and synchronization, decreases the overall system message throughput. During the time taken for a preamble transmission, no message information can be communicated to the receivers, thereby decreasing throughput of the system.

Synchronous protocols eliminate preamble signal, thereby enabling a more efficient battery savings. A synchronous signal divides the receivers into one of a plurality of group fields, each group field occurring at a predetermined period and having a predetermined maximum message information capacity. Since the synchronous signal is always being transmitted, no preamble signals are required, and a receiver needs only decode information while its preassigned group is being transmitted. However, varying traffic demands (the amount of message information for a group of receivers) may cause the amount of message information for one group of receivers to exceed the maximum capacity of the group field while another group field has available capacity. This causes transmission of idle signals during one group field, while in another group field, numerous messages are being queued because its capacity is exceeded. The throughput of the overall system is decreased because selective overload patterns are generated from the varying traffic levels within different group fields.

Thus, what is needed is method and apparatus for efficiently transmitting information to receivers while extending battery life of the receivers and increasing the throughput of the communication system.

DESCRIPTION OF A PREFERRED EMBODIMENT

Figure 1:
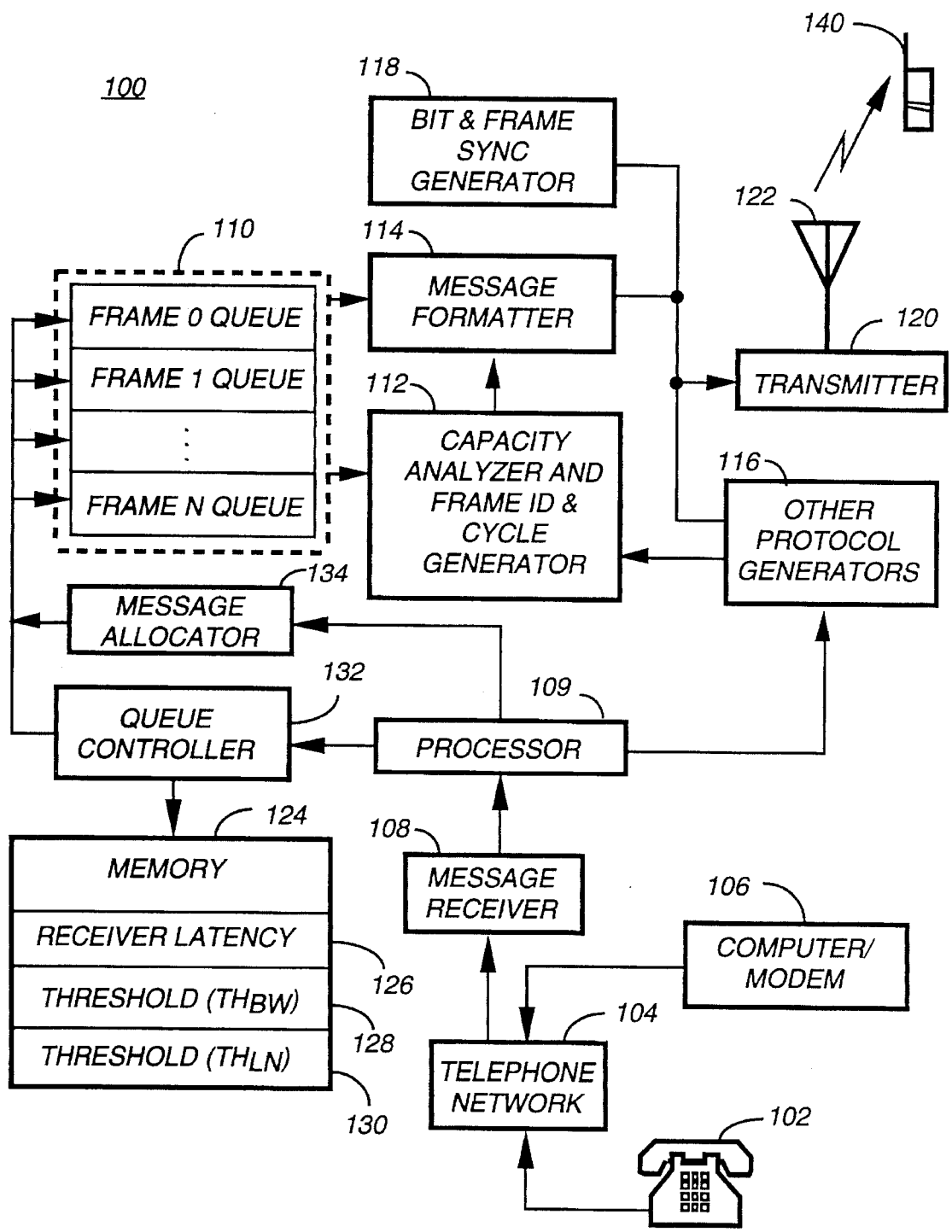
FIG. 1 is an electrical block diagram of a selective call system communicating with a plurality of selective call signals in accordance with a preferred embodiment of the present invention.

FIG. 1 shows an electrical block diagram of a synchronous communication system, for example a selective call (paging) system, transmitting a signal, for example a communication signal or a selective call (paging) signal, in accordance with a preferred embodiment of the present invention. It will be understood by one of ordinary skill in the art that although the invention is described using a selective call system, any other synchronous communication systems are equally applicable including, but not limited to, cellular communication, etc. The scope of invention therefore is not limited to the specific embodiment of the communication system describing the inventive concepts herein. The functions of the selective call (paging) system 100 are preferably implemented within software, for example within a MODAX 500 Radio Paging Terminal which is manufactured by Motorola Inc. Operationally, to send a message or page, a subscriber uses a telephone 102 for initiating a transmission of a selective call signal including the message addressed to a designated at least one of the selective call receivers 140. As is well known, the telephone 102 couples to the selective call system 100 via a telephone network 104, the operation of which is well known to one of ordinary skill in the art. Similarly, a computer/modem 106 is also coupled to the telephone network 104 for entering information, for example alphanumeric, numeric or voice messages. The telephone network 104 couples to a message receiver 108 which receives the messages to be transmitted to a plurality of selective call receivers 140 typically from the public switched telephone network 104. A processor (or terminal processor) 109, couples to the message receiver 108, and determines the appropriate protocol and address for encoding the message. If the processor 109 determines the signal format of the message to be other than FLEX™ protocol then the processor 109 passes the message to one of another protocol generator 116 which can include Golay Synchronous Code (GSC) and POCSAG (Post Office Standardisation Signaling Advisory Group) protocol generators well known to one of ordinary skill in the art.

Figure 2:
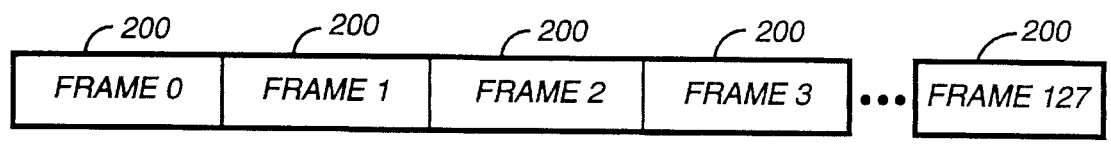
FIGS. 2–5 are timing diagrams of a communication signal in accordance with the preferred protocol for transmitting selective call messages according to FIG. 1.
Figure 3:
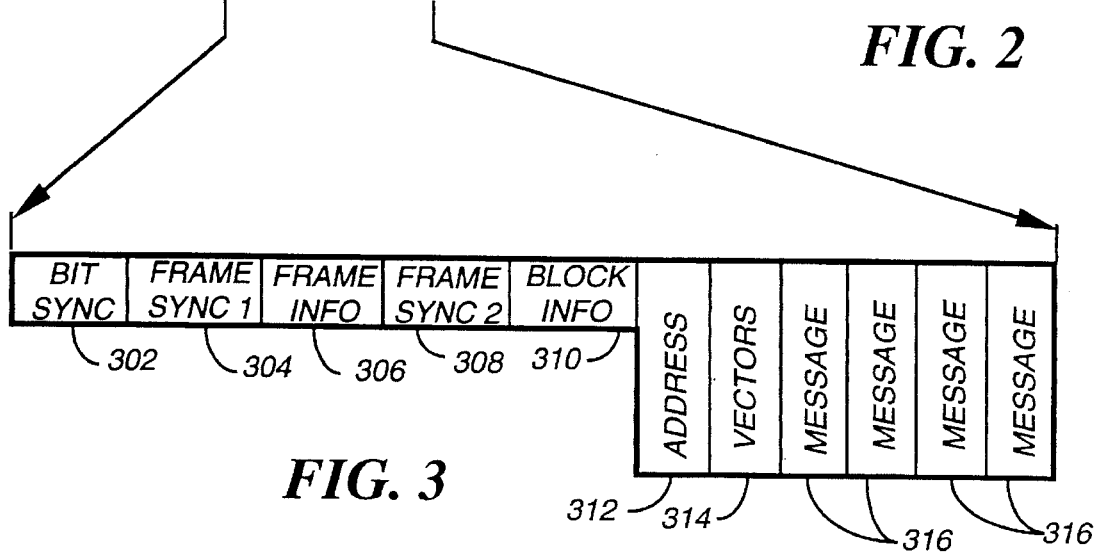
Figure 4:
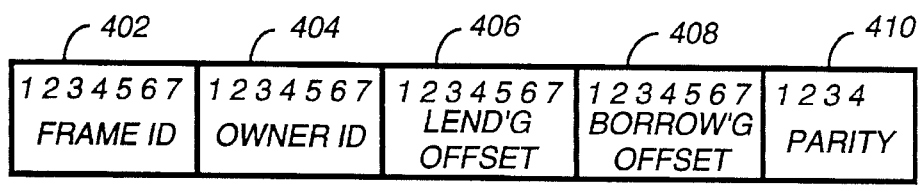

FIGS. 2–4 show timing diagrams for the FLEX™ protocol synchronous signal in accordance with the preferred protocol for transmitting selective call messages according to FIG. 1. Referring to FIG. 2, the selective call (paging) signal comprises a number of, preferably one-hundred-twenty-eight (128), message packets or frames 200. Each frame 200 is preferably 1.875 seconds in duration and has a preferred base data rate of 6400 bits per second. Although, it will be appreciated by one of ordinary skill in the art that other data rates can be used including the ability to use multiple data rates.

Referring to FIG. 3, each frame comprises of a bit sync signal 302, preferably 32 bits of alternating 1,0 pattern followed by a frame sync #1 signal 304 preferably one of several predetermined thirty-two bit words, and a frame info signal 306, preferably one thirty-two bit word having twenty-one variable information bits containing information such as a cycle number and a frame number. The bit sync signal 302 provides bit synchronization to the selective call receiver(s) 140 while the frame sync signal 304 provides frame synchronization and includes a signal indicative of the data rate of the message information.

Following the frame info word 306 is a frame sync #2 308. Following the frame sync #2 308 is a block info word signal 310 having more than one thirty-two bit words including information such as the number of priority addresses, end of block information field, vector start fields and the system collapse value mask. The system collapse mask is the same for each 128 frames of a selective call transmission, and is used by the selective call receiver 140 to operate in another battery saving mode or period different from the battery saving mode or period preprogrammed in the selective call receiver 140.

Referring to FIG. 4, the block info signal 310 has a 32 bit code word which preferably includes a frame identifier (ID) 402, an owner ID 404, a lending offset 406 and a borrowing offset 408. The remaining four bits 410 are used for some type of error correction, for example parity. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. Alternatively, the frame ID 402 can be transmitted in the frame info word 306 while the block info 310 includes the owner ID 404, the lending offset 406, and the borrowing offset 408, each having seven bits in length with ten bits used for parity and one bit as even parity according to BCH code word.

Referring back to FIG. 3, the addresses are located in block 312 and the vectors pointing to the messages, if applicable, are located in block 314 and the messages are located in the remaining blocks 316. Preferably, all of the address signals within the frame are located in a first portion 312 and the information signals are located in a subsequent portion of the block 316. It is well known to those skilled in the art how the locate addresses in a first portion 312 and message information 316 in a second portion of the frame 200. Words 312–316 are shown in a vertical orientation to indicate that these words can be interleaved in order to improve the immunity of the transmission to burst errors. It is understood by one of ordinary skill in the art that interleaving may be modified or eliminated.

Referring to FIG. 1, a queue controller 132 in response to the processor 109 determines the frame queue 110 that corresponds to the designated frame number of the selective call signal (FIG. 2) and a message allocator 134 stores the messages to be transmitted on the FLEX™ protocol in a frame queue buffer 110 which has queues corresponding to each frame of the selective call signal. According to the preferred embodiment of the present invention, the corresponding number of frames N are 0–127. The assigned frame of the selective call receiver 140 corresponding to the message designation is determined by the processor 109. However, before the message is stored in the corresponding frame queue 110, the queue controller 132 measures a parameter indicating a traffic associated with each of the plurality of frames 200 and the queue controller 132 determines and stores a lending threshold (130) and a borrowing threshold (128) in memory 124 for reallocating the designated selective call receiver 140 to another frame queue 110 when the traffic on the designated queue exceeds the frame borrowing threshold. The processor 109 thereafter identifies a frame queue having traffic below the lending threshold as a first frame (a frame to be lent or a lending frame) and the designated frame which has traffic exceeding the borrowing threshold as the second frame (borrowing frame). The processor 109 calculates the frame lending offset for the lending frame indicating the battery saving period of the selective call receivers 140 assigned to the lending frame, and calculates the frame borrowing offset for the receivers assigned to the borrowing frame indicating the battery saving period to receive the lending frame.

A message formatter 114 encodes the frame identifier, the owner identifier, the frame borrowing offset and the frame lending offset in the first and second (the lending and borrowing) frames for reallocating the designated (second) selective call receiver(s) 140 assigned to the second frame to the first frame. A message allocator 134 distributes the messages addressed to the selective call receiver assigned to the borrowing frame in the borrowing and lending frames. A capacity analyzer and frame ID/cycle generator 112 determine the sequence of frames to be transmitted, analyze the capacity of each frame and determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of selective call receivers 140 and the frame queue, the frame in which the message is to be included. The messages are then formatted for transmission. A terminal transmitter 120 accepts signals from blocks 118, 114 and 112 and modulates and transmits radio frequency selective call signals to the selective call receiver(s) 140 via an antenna 122 in a manner well known to those of ordinary skilled in the art.

Figure 5:
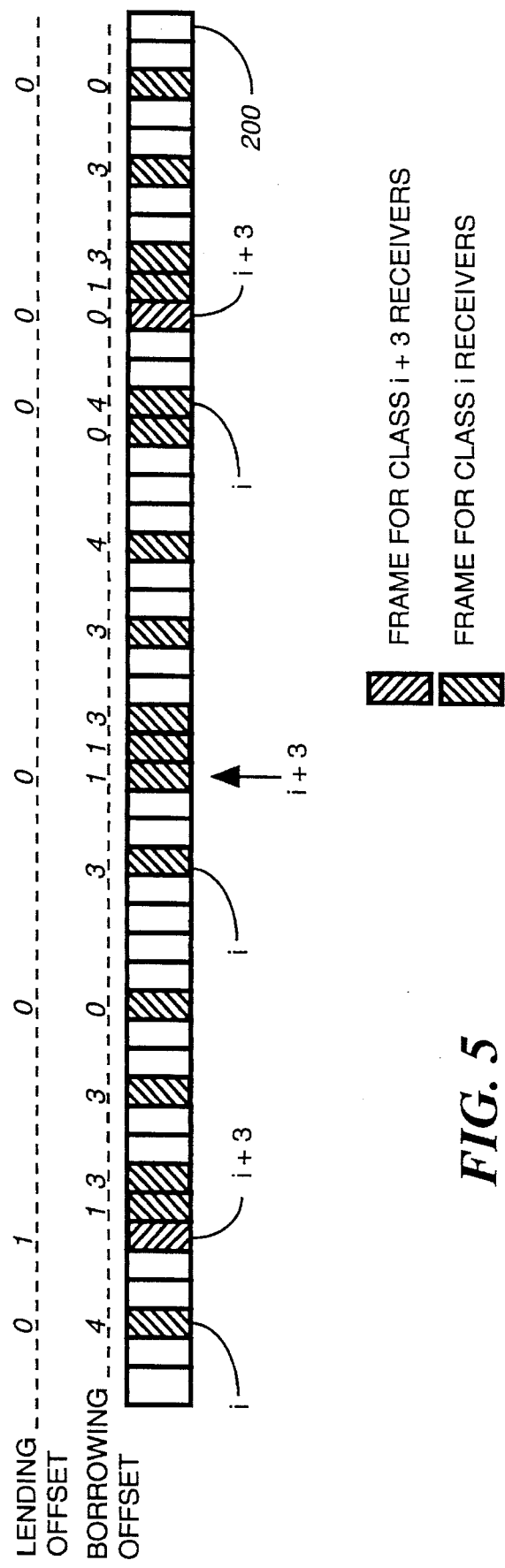

Referring to FIG. 5, an example of the selective call signal is shown illustrating the reallocation of frames according to the preferred embodiment of the present invention. When an identification of the selective call receiver (receiver identifier [ID]) is equal the frame ID 402, the selective call receiver is receiving its assigned (home) frame. Thereafter, if the frame lending offset is set, then the assigned frame is being lent to selective call receiver(s) of another class. If the lending offset is not set, and the borrowing offset is set, the selective call receiver will receive the borrowing offset to determine a new battery saving period because the selective call receiver is being reallocated to another frame (a lending frame or a borrowed frame). Alternatively, when the receiver identifier is not equal to the frame ID, the selective call receiver is not receiving its home frame. The selective call receiver then checks if the borrowing offset is set to determine if it is being reallocated to another frame before it receives its home frame. The selective call receiver can be reallocated more than once before the next occurrence of its home frame. Also, the lending offset cannot exceed a latency (receiver latency) 126 of the selective call receivers 140 which is stored in memory 124 because some selective call receiver 140 cannot be reallocated because they belong to emergency personnel who must receive their messages immediately. Latency determines the maximum time a selective call receiver 140 can wait before it receives its message.

The lending offset determines the number of assigned frame a selective call receiver should battery saving through because its assigned frame is being temporarily reassigned to another class of selective call receivers 140. The selective call receiver therefore sleeps for the number of multiple of frames indicated by the lending offset.

Referring to FIG. 5, a selective call receiver 140 assigned to the frame i (the class i selective call receiver) will receive a borrowing offset of four (4) and battery saves to the i+4 frame and receive information in the i+4 frame. In the i+4 frame, the borrowing offset is one (1), so the selective call receiver 140 will receive the (i+4)+1=i+5 frame. Alternatively, the class i+3 selective call receiver 140 (the selective call receiver assigned to the i+3 frame) receives the lending offset equal to one (1) indicating the battery saving period which informs the receiver to battery save or sleep through its next assigned frame. The selective call receiver assigned to the i+3 frame will not receive the next occurrence of the i+3 frame because its home frame will be reallocated to another class of selective call receiver(s).

Continuing, the class i selective call receiver 140 receiving the i+5 frame will receive the borrowing offset of three (3), and will battery save to the (i+5)+3=i+8 frame which has a borrowing offset of three (3) again which causes it to battery save to the i+11 frame to receive a borrowing frame of zero (0). The class i selective call receiver 140 will therefore receive its home or assigned frame, the next occurrence of frame i. At the next occurrence of frame i, the selective call receiver 140 assigned to that frame will receive a borrowing offset of three (3) and will battery save to receive the next i+3 frame. The i+3 frame has a borrowing offset of one (1) and a lending offset of zero (0). Therefore, if the selective call receiver 140 assigned to the i+3 frame was to just turn-on, it will know that its frame has been reallocated because the receiver ID does not equal the owner ID 404; and because the lending offset is zero (0), the selective call receiver 140 will know that it should receive the next occurrence of its i+3 assigned frame.

The class i selective call receiver 140, will receive the i+4 frame which directs it to the i+5 frame. The i+5 frame directs the class i selective call receiver 140 to the (i+5)+3=i+8 frame. The i+8 frame directs the class i selective call receiver 140 to the i+11 frame which directs the class i selective call receiver 140 to the i+15 frame. The i+15 frame has a zero (0) borrowing offset, so the class i selective call receiver 140 will receive its home (assigned) frame which is the next frame because this illustration used a multiple frame size of sixteen (16) frames for convenience.

The selective call receiver 140 assigned to the i+3 frame will receive the next i+3 frames having a borrowing offset of zero (0) and a lending offset equal to zero (0) indicating that the messages are directed only to the class i+3 selective call receiver 140. However, the selective call receiver 140 assigned to the ith frame, will borrow the next i+4 frame, the next i+5 frame, the next i+8 frame and the next i+11 frame before it receives its assigned frame i again.

In this way, selective call receivers assigned to a home frame can be temporarily be reassigned to another frame if the selective call receiver's home frame has a queue exceeding the borrowing threshold and another frame is identified that has a queue below the lending threshold. The lending and borrowing frames are encoded with the owner ID, the frame lending offset and the frame borrowing offset to reallocate different classes of selective call receiver to different frames as determined by the traffic on the plurality of frames.

Figure 6:
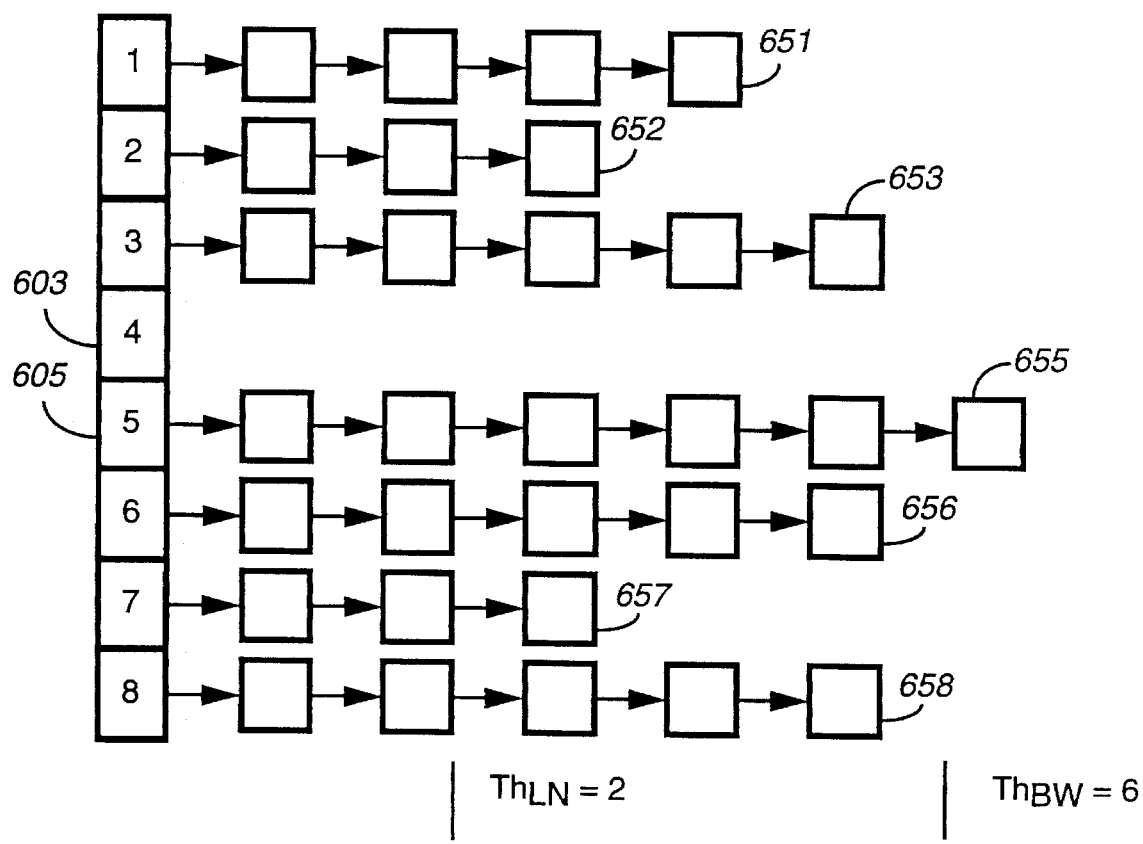
FIG. 6 is block diagram illustrating traffic queue on the plurality of frames of the communication signal in accordance with the preferred embodiment of the present invention.

Referring to FIG. 6, a block diagram illustrating traffic queue on the plurality of frames of the communication signal is shown in accordance with the preferred embodiment of the present invention. Frames 1 to 8 are illustrated for convenience. Paging message chains 651, 652, 653, 655, 656, 657, 658 are shown for each of the eight frames designating the traffic load or messages queued to be transmitted. The queues or traffic can be measured as the average bits-per-second, instantaneous bits-per-second or the number of packets in the paging message chains. If, for example, the borrowing threshold ($Th_{BW}$) is set to six packets, and the lending threshold ($Th_{LN}$) is set to two packets, then according to the preferred embodiment of the present invention, frame 605 will be designated a borrowing frame and frame 603 will be designated a lending frame. Therefore, in the next occurrence of frame 4, frame 4 will be lent of the selective call receivers 140 assigned to frame 5 while the selective call receivers 140 assigned to frame 4 will battery save during the time their assigned frame are reallocated to the selective call receivers 140 assigned to frame 5.

Figure 7:
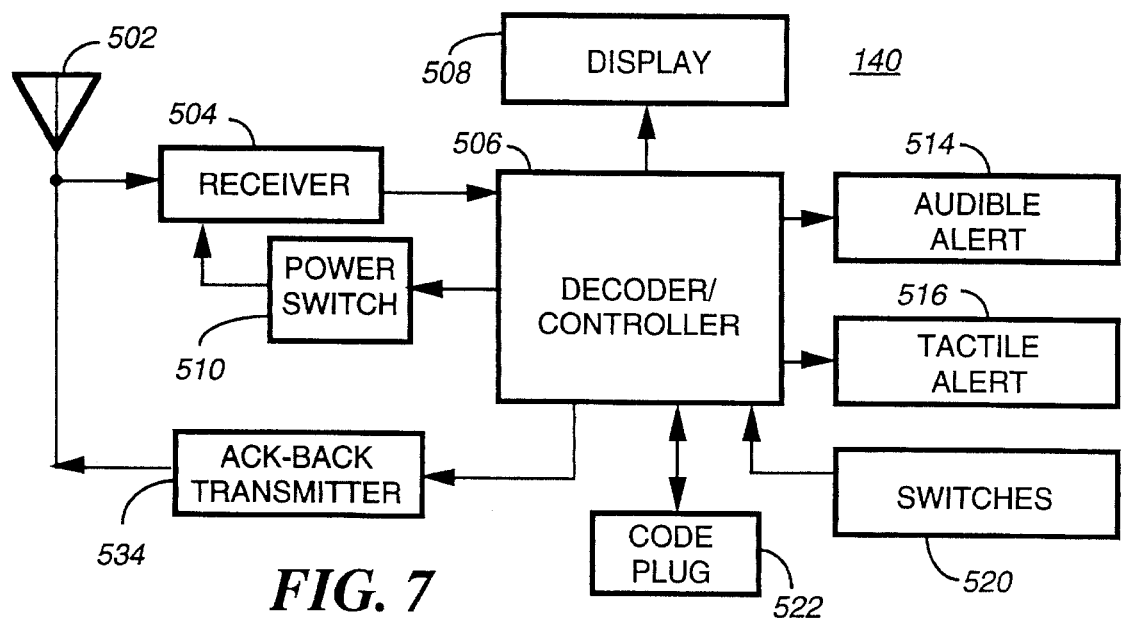
FIG. 7 is an electrical block diagram of a battery operated selective call receiver operating in accordance with the preferred embodiment of the present invention.

Referring to FIG. 7, an electrical block diagram of a selective call receiver is shown in accordance with the preferred embodiment of the present invention. The selective call receiver 140 comprises an antenna 502 for intercepting transmitted radio frequency (RF) signals which are coupled to the input of a receiver 504. The RF signals are preferably selective call (paging) message signals which provide, for example, a receiver address and an associated message, for example as alphanumeric. However, it will be appreciated that other well known paging signaling formats, such as tone only signaling or tone, numeric or voice signaling, would be suitable for use as well. The receiver 504 processes the RF signal and produces at the output a data stream representative of a demodulated data information. The demodulated data information is coupled into the input of a decoder/controller 506 which processes the information in a manner well known in the art. An ack-back transmitter 534 is coupled to the antenna 502 and the decoder/controller 506 for providing acknowledgment. A power switch 510, coupled to the decoder/controller 506, is used to control the supply of power to the receiver 504, thereby providing a battery saving function or for changing the battery saving periods.

For purposes of this illustration, it will be assumed that the FLEX™ signaling format is used although other signaling formats could be utilized as well. When the receiver becomes bit and frame synchronized and the address is received by the decoder/controller 506, the received address is compared with one or more addresses stored in a code plug (memory) 522, and when a match is detected, an alert signal is generated to alert a user that a selective call message, or page, has been received. The alert signal is directed to an audible alerting device 514 for generating an audible alert or to a tactile alerting device 516 for generating a silent vibrating alert. Switches 520 allow the user of the selective call receiver to, among other things, select between the audible alert 514 and the tactile alert 516 in a manner well known in the art.

The message information which is subsequently received is stored in memory 620 (FIG. 8) and can be accessed by the user for display using one or more of the switches 520 which provide such additional functions as reset, read, and delete, etc. Specifically, by the use of appropriate functions provided by the switches 520, the stored message is recovered from memory and processed by the decoder/controller 506 for displaying by a display 508 which enables the user to view the message. The receipt of the message by the selective call receiver 140 can automatically generate the ack-back response to the selective call base station to inform it that the message was successfully received. Preferably, the user will have the opportunity to input a message by using switches 520 or some other input devices well known to one of ordinary skill in the art. When the message is entered, the decoder/controller 506 processes the message by encoding an addressed derived from the received message to generate the ack-back response. The encoded ack-back response is then transmitted to the selective call base station that originated the paging message by techniques well known to one of ordinary skill in the art.

Figure 8:
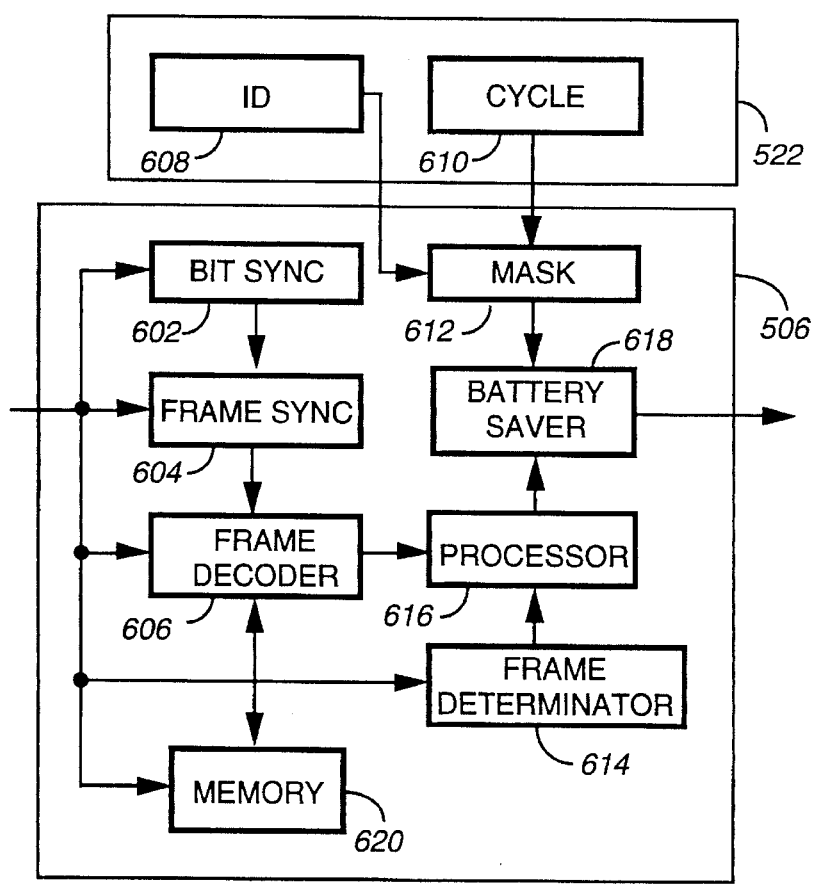
FIG. 8 is a more detailed electrical block diagram of the decoder/controller of the selective call receiver according to FIG. 7.

FIG. 8 shows a more detailed electrical block diagram of the decoder/controller of the selective call receiver according to FIG. 7. The decoder/controller 506 preferably includes a frame decoder 606 for identifying the received frames or packets. A bit sync (synchronizer) 602 uses the bit sync block 302 to obtain bit synchronization to the selective call signal and the frame sync (synchronizer) 604 uses the frame sync #1, #2 304, 308 to obtain frame synchronization to the selective call signal in a manner known to one of ordinary skill in the art. The code plug 522 has a predetermined frame ID 608, a predetermined cycle value 610, and a predetermined address assigned to the selective call receiver 140, as well as other signals which configure the selective call receiver 140 for desired operating characteristics. The predetermined cycle value 610 allows one selective call receiver 140 to be assigned to a plurality of frames (assigned or home frame). The predetermined frame ID 608 is masked with the predetermined cycle value 610 to generate a mask 612 (the receiver identifier or receiver ID) indicating of a first period of reception of the selective call receiver and is used by battery saver 618 to determine the battery saving period of the selective call receiver 140. The receiver identifier (ID) is the classification of the receiver address to determine the home frame or assigned frame. For example, if there are a multiple of one hundred-twenty-eight (128) frames, the receiver ID preferably comprises the last seven (7) bits of the selective call receiver's address wherein $2^7$ is equal to 128. Therefore, all selective call receivers assigned to the same frame will have, for example, the same last seven bits which is the receiver ID designating the home frame. The battery saver 618 deactivates and activates receiver 504 via the power switch 510 (FIG. 7) for certain frames thereby conserving battery power.

When the selective call receiver 140 receives the block info 310, a frame decoder 606 determines the home frame of the selective call receiver by docoding the frame identifier (ID), the owner identifier (ID). A frame determinator 614 compares the receiver ID with the frame ID to determine if the selective call receiver is receiving information in its home frame. When the receiver ID and the frame ID are equal, the selective call receiver is receiving information in its home frame. Also, if the owner identifier (ID) is equal to the receiver ID, the information transmitted in the assigned frame is directed to the selective call selective call receiver assigned to that frames. If the lending offset is set, a processor 616 couples to the frame decoder 606 and calculates a first battery saving period indicated by the frame lending offset of the block info 310 of the assigned frame in response to receiving the selective call signal having the receiver ID equal to the frame identifier (ID) 404 encoded in the assigned frame. Alternatively, it the frame lending offset is not set, the processor 616 checks the frame borrowing offset, and if it is set, the processor 616 calculates a second battery saving period to a next occurrence of a borrowed frame indicated by the frame borrowing offset 408. The battery saver 618 in response to the processor 616 disables the receiver 504 during the first or the second battery saving period in response to the frame determinator 614 and activates the receiver 504 for receiving a next frame.

In this way, a selective call receiver can determine from the received selective call signal whether the selective call system has reallocated its assigned frame because the number of message packets were below the frame lending threshold, or whether it is can receive other frames because the message packets on its assigned frame exceeds the frame borrowing threshold. The selective call receiver, whether it is borrowing or lending frames, determines a new battery saving period which is designated by the frame borrowing offset or the frame lending offset, respectively.

Figure 9:
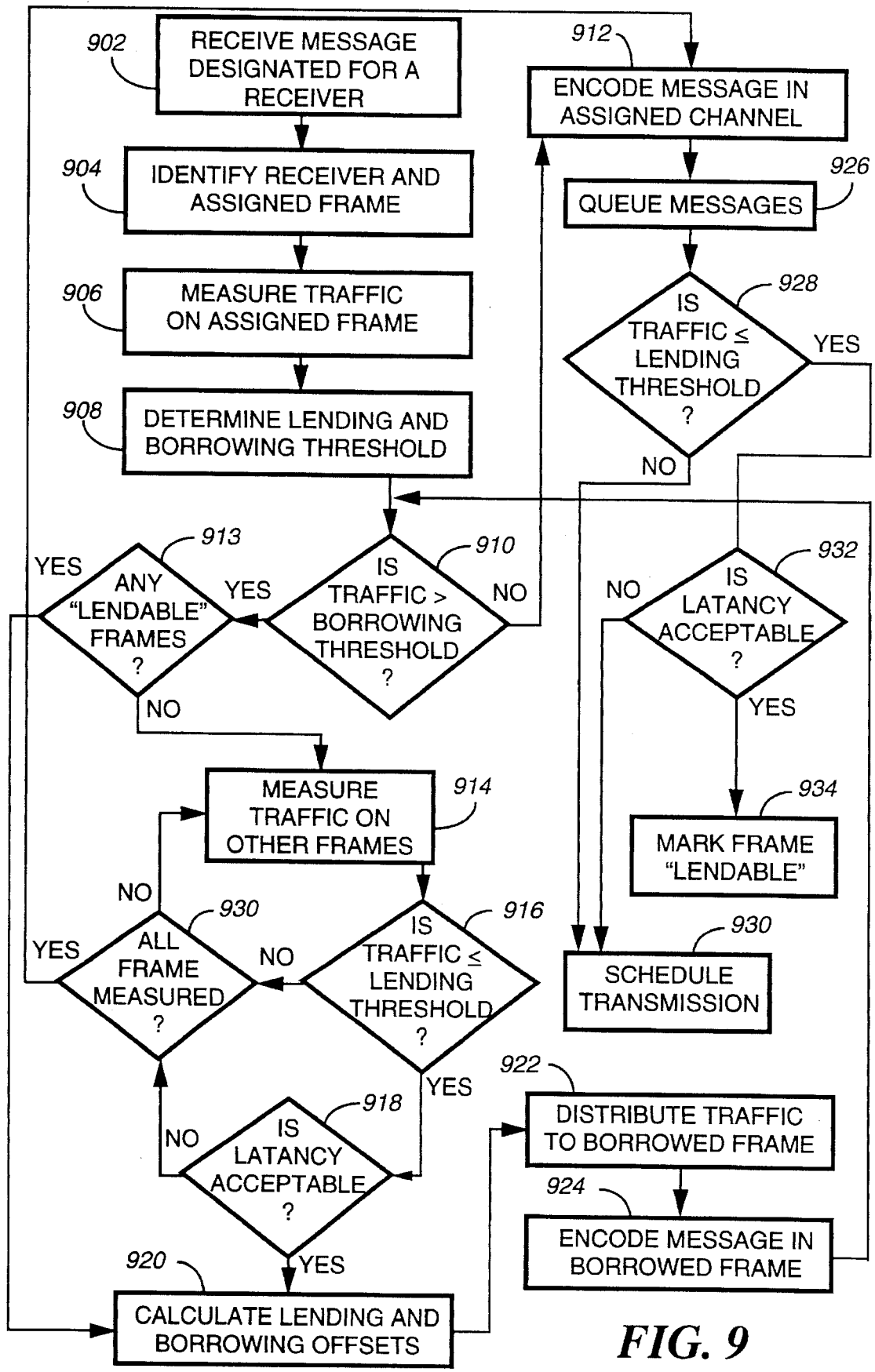
FIG. 9 a flow diagram illustrating the details of reallocating frame assignments according to the communication system of FIG. 1.

Referring to FIG. 9, a flow diagram illustrating the operation of the selective call system for reallocating frame assignments accordance with the present invention. The selective call system via the message receiver 108 receives message from a user or subscriber designating a selective call receiver 140, step 902. The processor 109 identifies the selective call receiver 140 to be addressed and the queue controller 132 determines the frame queue number to store the message to be transmitted in a corresponding frame number, step 904. However, before the message is stored in the identified frame queue number, the queue controller 132 measures a parameter indicating a traffic associated with each of the plurality of frames, step 906. The parameter according to the preferred embodiment includes the message packets queued at each frame queue number for subsequent transmission to a designated selective call receiver 140. The queue controller 132 determines a lending threshold and a borrowing threshold for reallocating a frame assignment, step 908. The lending threshold 130 determines when the number of message packets queued on a frame is below a predetermined number to allow the system to reallocate or to lend that frame to other selective call receiver(s) assigned to another frame that has a number of message packets queued on its assigned frame exceeding a predetermined number, the borrowing threshold 128. The borrowing threshold 128 indicates when a frame is overloaded, and to improved the system capacity, the selective call receivers assigned to the borrowing frame should be temporarily assigned to another frame, the lending frame. In step 910, the number of message packets are checked on the frame queue number to determine if the number exceeds the borrowing threshold. If the borrowing threshold is not exceeded, step 910, the message is encoded and stored in the frame queue corresponding to the assigned frame (channel) of the designated selective call receiver, step 912. The message is queued, step

926. In step 928, the traffic on the frame is checked to determine if it is below the lending threshold. If so, the latency is checked to determine if it is acceptable, step 932. If so, the frame is marked as "lendable", step 934. If the traffic is not below the lending threshold, step 928, or the latency is not acceptable, step 932, the next transmission is schedule, step 930.

Alternatively, when the traffic exceeds the borrowing threshold 128, step 910, the frames are checked to determine if any frames were previously marked as lendable, step 913. If no lendable frame exists, the frame is identified as a borrowing frame, and the system begins to measure the traffic on the other queues (frames) to determine a lending frame (a frame to be borrowed), step 914. In step 916, each other queue that is measured is checked to determine if the traffic is below the lending threshold, 130. If not, the process checks if all frames have been checked for traffic below the lending threshold, step 930. If not, the step returns to step 914 to measure traffic on other frames. If all frames have been checked in step 930, the process continues to step 912 to encode the message in the assigned channel. However, if the traffic is below the lending threshold in step 916, the processor then determines the receiver latency 126 of the selective call receivers assigned to the lending frame to ensure that the selective call receivers can tolerate their assigned frame being lent and not receive any messages during that period if a new message is received, step 918. If the receiver latency 126 is not acceptable, the process returns to step 930 to check if all frame have been measured. If, however, the receiver latency is acceptable in step 918 or if there are lendable frames, step 913, the frame lending offset and the frame borrowing offset are calculated to determine the new battery saving periods for the selective call receivers assigned to the lending frame and the borrowing frame, step 920. The message allocator 134 distributes the messages in the lending frame for the selective call receiver assigned to the borrowing frame, step 922. The step of distributing includes encoding the frame identifier, the owner identifier, the frame borrowing offset and the frame lending offset in the frames for reallocating frame assignment, step 922. The message is then encoded in the borrowed or lending frame, step 924, and the process returns to step 910.

In this way, the selective call system can determine from the queue length on each frame queue whether the selective call system can increase system capacity by reallocating frames when the number of message packets are below the frame lending threshold of at least one frame and the number of message packets on another frame exceeds the frame borrowing threshold. The messages destined for a frame number that has traffic exceeding the borrowing threshold are reallocated to another frame that has traffic below the frame lending threshold. The lending frame is encoded with a new owner ID, a frame lending offset, and a frame borrowing offset; the frame borrowing offset is encoded when the selective call receivers borrowing the lending frame are to be reallocated again before the next occurrence of its home frame. The borrowing frame is encoded with a new frame borrowing offset to determine the battery saving period to receive the lending frame being reallocated to the selective call receivers assigned to the borrowing frame.

Figure 10:
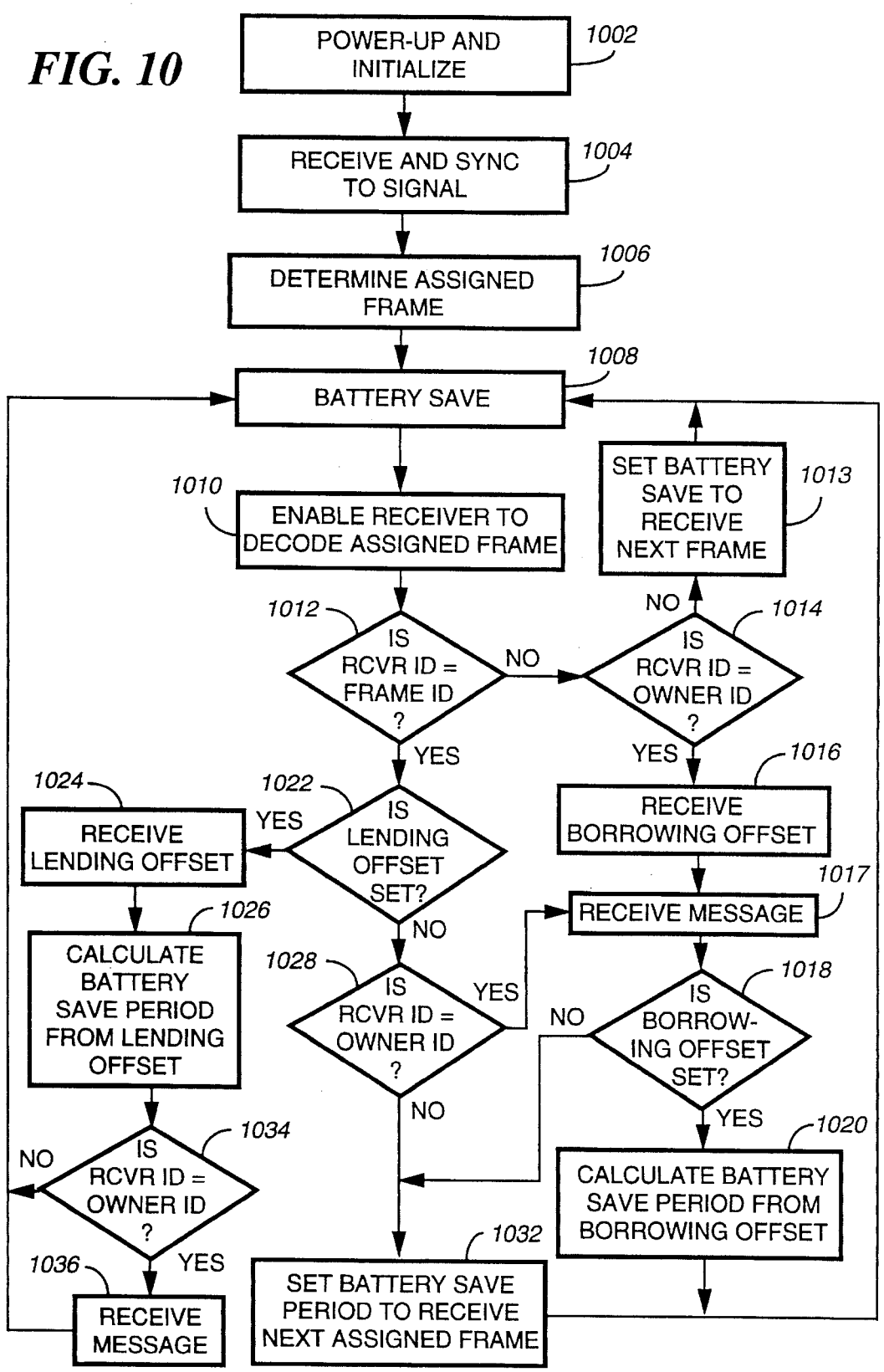
FIG. 10 a flow diagram for illustrating the steps of determining frame assignment of the selective call receiver of FIG. 7.

Referring to FIG. 10, a flow diagram for illustrating the steps of determining the frame assignment of the selective call receiver of FIG. 7 is shown. Once the selective call receiver 140 powers-up and performs its initialization functions, step 1002, it begins to receive and to become synchronized to the selective call signal, step 1004. The selective call receiver 140 determines its assigned frame, step 1006, by interrogating the frame ID 402 and battery saves to the frame determined to be its assigned frame, step 1008. Power is applied to the receiver of the selective call receiver (the receiver is activated) to receive information or messages in the predetermined frame, step 1010. In step 1012, the process checks if the receiver ID is equal to the frame ID 402. If not, process checks if the receiver ID is equal to the owner ID 404. If not, the battery saving period is set to receive the next frame (or to disable battery saving), step 1013 and then the process returns to step 1008. However, if the receiver ID is equal to the owner ID in step 1014, the frame borrowing offset is received, step 1016 and the message is received, step 1017. In step 1018, the process checks if the borrowing offset is set, and if so, the battery saving period is calculated from the borrowing offset, 1020, and then the process returns to step 1008. However, if the borrowing offset is not set in step 1018, the battery saving period is set to receive the next occurrence of the assigned or home frame, step 1032.

Returning to step 1012, if the receiver ID is equal to the frame ID, the process checks if the lending offset is set, step 1022. If yes, the lending offset is received, step 1024, and the battery saving period is calculated from the lending offset, step 1026. The process then checks if the receiver ID is equal to the owner ID, step 1034, and if so, the message is received, step 1036, and then the process returns to step 1008. When the receiver ID is not equal to the owner ID in step 1034, the process returns to step 1008. If, however, the lending offset is not set in step 1022, the process checks if the receiver ID is equal to the owner ID, step 1028. If so, the process flows continues to step 1017 to receive the message. Alternatively, if the receiver ID is not equal to the owner ID in step 1028 or if he borrowing offset is not set in step 1018, the battery saving period is set or calculated to the next assigned frame of the receiver, step 1032 and the process returns to step 1008 to battery save to the next assigned frame.

In this way, the selective call receiver, from the selective call signal, determines a new battery saving period to skip at least one of its assigned frames as determined by the frame lending offset when the traffic on that assigned frame is below the frame lending threshold. Alternatively, when the traffic is above the frame borrowing threshold, the selective call receiver determines the battery saving period to received information on a borrowed frame, the lending frame. According to the inventive concepts discussed, a communication system can improve system throughput while determining battery saving periods of the selective call receiver as a function of the traffic load on the frames of the selective call signal.

Although more than one embodiment of the invention has been described by way of example, other modifications may be made to the description herein, while remaining within the spirit of the present invention.

In summary, a communication system communicates with a plurality of receivers having assigned frames with at least a first receiver assigned to a first frame and at least a second receiver assigned to a second frame of a signal. A method for reallocating frame assignments comprises the steps of (a) receiving a message being designated for the second receiver, and (b) transmitting the signal to the plurality of receivers in the assigned frames. The signal comprises a plurality of frames, each frame has a frame identifier, an owner identifier, a frame lending offset and a frame borrowing offset. The method further comprises the steps of (c) measuring a parameter indicating a traffic associated with each of the plurality of frames, the step (c) of measuring further includes a step (d) of determining a lending threshold and a borrowing threshold for reallocating a frame assignment, (e) identifying a frame having traffic below the lending threshold as the first frame and another frame having traffic exceeding the borrowing threshold as the second frame in response to the parameter indicating the traffic, (f) calculating the frame lending offset for the first frame and the frame borrowing offset for the second frame, (g) encoding the frame identifier, the owner identifier, the frame borrowing offset and the frame lending offset in the first and second frames for reallocating frame assignment and (h) distributing messages addressed to the second receiver in the first frame and the second frame.

I claim:

1. In a communication system for communicating with a plurality of receivers having assigned frames wherein at least a first receiver assigned to a first frame and at least a second receiver assigned to a second frame of a signal, a method for reallocating frame assignments, comprising the steps of:

(a) receiving a message being designated to the second receiver;

(b) transmitting the signal to the plurality of receivers in the assigned frames, the signal comprising a plurality of frames, each frame having:
a frame identifier;
an owner identifier;
a frame lending offset; and
a frame borrowing offset;

(c) measuring a parameter indicating a traffic associated with each of the plurality of frames, said step (c) of measuring further includes a step (d) of determining a lending threshold and a borrowing threshold for reallocating a frame assignment;

(e) identifying a frame having traffic below the lending threshold as the first frame and another frame having traffic exceeding the borrowing threshold as the second frame in response to the parameter indicating the traffic;

(f) calculating the frame lending offset for the first frame and the frame borrowing offset for the second frame;

(g) encoding the frame identifier, the owner identifier, the frame borrowing offset and the frame lending offset in the first and second frames for reallocating frame assignment; and (h) distributing messages addressed to the second receiver in the first frame and the second frame.

2. The method according to claim 1 wherein the first receiver assigned to the first frame further comprising the steps of:

(i) determining a battery saving period indicated by the frame lending offset of the first frame in response to the first receiver receiving the signal with the frame identifier encoded in the first frame not equal to a receiver identifier; and (j) disabling the first receiver for the battery saving period determined in step (i).

3. The method according to claim 2 further comprising a step of comparing a receiver latency with the battery saving period for determining whether to lend the first frame.

4. The method according to claim 1 wherein the second receiver assigned to the second frame further comprising the steps of:

(i) determining a battery saving period indicated by the frame borrowing offset of the second frame when a receiver identifier is not equal to the frame identifier but is equal to the owner identifier;

(j) disabling the second receiver for the battery saving period determined in step (i) to a next occurrence of the first frame; and (k) activating the second receiver for receiving the next occurrence of the first frame.

5. The method according to claim 1 further comprising the steps of:

(i) the first receiver determining a battery saving period indicated by the frame lending offset of the first frame in response to receiving the signal having the frame identifier encoded in the first frame not equal to a receiver identifier;

(j) the first receiver battery saving for the battery saving period determined in step (i);

(k) the second receiver determining a battery saving period indicated by the frame borrowing offset of the second frame when a receiver identifier is not equal to the frame identifier but equal to the owner identifier; and (l) disabling the second receiver for the battery saving period determined in step (k) to a next occurrence of the first frame; and (m) activating the second receiver for receiving the next occurrence of the first frame.

6. A communication system for reallocating frame assignments including a terminal for communicating with a plurality of selective call receivers having assigned frames wherein at least a first selective call receiver is assigned to a first frame and at least a second selective call receiver is assigned to a second frame of a selective call signal, the terminal comprising:

a message receiver receiving a message designating the second selective call receiver;

a terminal transmitter for transmitting the selective call signal to the plurality of selective call receivers in the assigned frames, the selective call signal comprising a plurality of frames, each frame having:
a frame identifier;
an owner identifier;
a frame lending offset; and
a frame borrowing offset;

a queue controller measures a parameter indicating a traffic associated with each of the plurality of frames wherein the queue controller determines a lending threshold and a borrowing threshold for reallocating the second selective call receiver to the first frame;

a processor, coupled to the queue controller, identifies a frame having traffic below the lending threshold as the first frame and a frame having traffic exceeding the borrowing threshold as the second frame in response to the queue controller, the processor calculates the frame lending offset for the first frame and the frame borrowing offset for the second frame;

a message formatter encodes the frame identifier, the owner identifier, the frame borrowing offset and the frame lending offset in the first and second frames for reallocating the second selective call receiver to the first frame; and a message allocator distributes messages address to the second selective call receiver in the first frame and second frame.

7. The communication system according to claim 6 wherein the first selective call receiver, comprising:

a receiver for receiving and synchronizing with the selective call signal;

a frame decoder for decoding the frame identifier and the owner identifier encoded in the assigned frames;

a frame determinator determines whether the frame is being reallocated when the frame identifier is different from a receiver identifier of the first selective call receiver;

a processor calculates a battery saving period indicated by the frame lending offset of the first frame in response to receiving the selective call signal having the owner identifier not equal to the receiver identifier encoded in the first frame; and a battery saver, in response to the processor, disabling the receiver during the battery saving period.

8. The communication system according to claim 7 wherein the queue controller compares a receiver latency with the battery saving period for determining whether to lend the first frame to the second selective call receiver.

9. The communication system according to claim 6 wherein the second selective call receiver, comprising:

a receiver for receiving and synchronizing with the selective call signal;

a frame decoder for docoding the frame identifier and the owner identifier encoded in the assigned frames;

a processor, coupled to the frame decoder, for calculating a battery saving period to a next occurrence of the first frame indicated by the frame borrowing offset when a receiver identifier of the second receiver is not equal to the frame identifier but is equal to the owner identifier; and a battery saver for disabling the receiver during the battery saving period and for activating the second receiver for receiving a next occurrence of the first frame.

10. The communication system according to claim 6 wherein a selective call receiver, comprising:

a receiver for receiving and synchronizing with the selective call signal;

a frame decoder for docoding the frame identifier and the owner identifier encoded in the assigned frames;

a frame determinator determines whether the frame is being reallocated in response to the frame identifier and the owner identifier wherein the first selective call receiver, comprising:

a first processor, coupled to the frame decoder, for calculating a first battery saving period indicated by the frame lending offset of the first frame in response to receiving the selective call signal having the frame identifier encoded in the first frame not equal to a receiver identifier; and a first battery saver, in response to the first processor, for disabling the receiver during the first battery saving period, wherein the second selective call receiver, comprising:

a second processor, coupled to the frame decoder, for calculating a second battery saving period to a next occurrence of the first frame indicated by frame borrowing offset of the second frame when the receiver identifier is not equal to the frame identifier but is equal to the owner identifier; and a second battery saver, coupled to the second processor, for disabling the receiver during the second battery saving period and for activating the receiver for receiving the next occurrence of the first frame.

11. A selective call receiver for receiving messages in an assigned frame of a selective call signal comprising a plurality of frames wherein each frame having a frame identifier, an owner identifier, a frame lending offset and a frame borrowing offset, comprising:

a receiver for synchronizing and receiving the selective call signal;

a frame decoder for determining the assigned frame and for docoding the frame identifier and the owner identifier encoded in the assigned frame;

a frame determinator determines whether the frame is being reallocated when the frame identifier is different from a receiver identifier associated with the receiver;

a processor, coupled to the frame decoder, for calculating a first battery saving period indicated by the frame lending offset of the assigned frame in response to receiving the selective call signal having the frame identifier encoded in the frame not equal to the receiver identifier; and a battery saver, in response to the processor, for disabling the receiver during the first battery saving period in response to the frame determinator, and for activating the receiver for receiving a next frame.

12. The selective call receiver according to claim 11 wherein the processor calculates a second battery saving period to a next occurrence of a borrowed frame indicated by the frame borrowing offset when the receiver identifier is not equal to the frame identifier but is equal to the owner identifier.

13. The selective call receiver according to claim 11 wherein the processor determines a second battery saving period to a next occurrence of a borrowed frame when a receiver identifier is equal to the frame identifier and the owner identifier encoded in the assigned frame.

14. In a selective call receiver for receiving messages in an assigned frame of a selective call signal comprising a plurality of frames wherein each frame having a frame identifier, an owner identifier, a frame lending offset and a frame borrowing offset, a method comprising the steps of:

(a) receiving and synchronizing to the selective call signal;

(b) determining the assigned frame;

(c) docoding the frame identifier and the owner identifier encoded in the assigned frame;

(d) determining whether the frame is reallocated when the frame identifier is different from a receiver identifier;

(e) calculating a first battery saving period indicated by the frame lending offset of the assigned frame in response to receiving the selective call signal having the frame identifier encoded in the frame not equal to the receiver identifier; and (f) disabling the step (a) of receiving during the first battery saving period and activating the step (a) of receiving for receiving a next frame.

15. The method according to claim 14 wherein the step of calculating calculates a second battery saving period to a next occurrence of a borrowed frame indicated by the frame borrowing offset when the receiver identifier is not equal to the frame identifier but is equal to the owner identifier.

16. The method according to claim 14 wherein the step of calculating calculates a second battery saving period to a next occurrence of a borrowed frame when a receiver identifier is equal to the frame identifier and the owner identifier encoded in the assigned frame.

17. A communication system for reallocating frame assignments including a terminal for communicating with a plurality of selective call receivers having assigned frames wherein at least a first selective call receiver is assigned to a first frame and at least a second selective call receiver is assigned to a second frame of a selective call signal, the terminal comprising:

a message receiver receiving a message designating the second selective call receiver;

a terminal transmitter for transmitting the selective call signal to the plurality of selective call receivers, the selective call signal comprising a plurality of frames, each frame having:
    a frame identifier;
    an owner identifier;
    a frame lending offset; and
    a frame borrowing offset;

a queue controller measures a parameter indicating a traffic associated with each of the plurality of frames wherein the queue controller determines a lending threshold and a borrowing threshold for reallocating the second selective call receiver to the first frame;

a processor, coupled to the queue controller, identifies a frame having traffic below the lending threshold as the first frame and a frame having traffic exceeding the borrowing threshold as the second frame in response to the queue controller, the processor calculates the frame lending offset for the first frame and the frame borrowing offset for the second frame;

a message formatter encodes the frame identifier, the owner identifier, the frame borrowing offset and the frame lending offset in the first and second frames for reallocating the second selective call receiver to the first frame; and a message allocator distributes messages address to the second selective call receiver in the first frame and second frame wherein a selective call receiver of plurality of selective call receivers, comprising:
    a receiver for receiving and synchronizing with the selective call signal;

a frame decoder for docoding the frame identifier and the owner identifier encoded in the assigned frames;

a frame determinator determines whether the frame is being reallocated in response to the frame identifier and the owner identifier wherein the first selective call receiver, comprising:

a first processor, coupled to the frame decoder, for calculating a first battery saving period indicated by the frame lending offset of the first frame in response to receiving the selective call signal having the frame identifier encoded in the first frame not equal to a receiver identifier; and a first battery saver, in response to the first processor, for disabling the receiver during the first battery saving period, the second selective call receiver, comprising:

a second processor, coupled to the frame decoder, for calculating a second battery saving period to a next occurrence of the first frame indicated by frame borrowing offset of the second frame when the receiver identifier is not equal to the frame identifier but is equal to the owner identifier; and a second battery saver, coupled to the second processor, for disabling the receiver during the second battery saving period and for activating the receiver for receiving the next occurrence of the first frame.

\* \* \* \* \*

UNITED STATES PATENT AND TRADEMARK OFFICE
CERTIFICATE OF CORRECTION

PATENT NO. : 5,550,829
DATED : August 27, 1996
INVENTOR(S) : Zhonghe Wang

It is certified that error appears in the above-indentified patent and that said Letters Patent is hereby corrected as shown below: On the title page and column 1, line 2

In the title, change "RECEIVES" to --RECEIVERS--.

In Column 12, Claim 6, Line 63, change "address" to --addressed--.

In Column 13, Claim 9, Line 25, change "docoding" to --decoding--.

In Column 13, Claim 10, Line 42, change "docoding" to --decoding--.

Column 14, Claim 11, Line 9, change "docoding" to --decoding--.

Column 14, Claim 14, Line 43, change "docoding" to --decoding--.

Column 16, Claim 17, Line 1, change "address" to --addressed--.

Column 16, Claim 17, Line 7, change "docoding" to --decoding--.

Signed and Sealed this

Eighth Day of April, 1997

*Attest:*

BRUCE LEHMAN

*Attesting Officer*     Commissioner of Patents and Trademarks